US006414695B1

(12) United States Patent
Schwerdtfeger et al.

(10) Patent No.: US 6,414,695 B1
(45) Date of Patent: Jul. 2, 2002

(54) SYSTEM FOR ADDING FUNCTION TO AN OBJECT ORIENTED PROGRAM THROUGH A COMPUTER CONTROLLED INTERACTIVE DISPLAY INTERFACE WITH ALTERNATE ACCESS TO DATA IN THE OBJECT ORIENTED PROGRAM NORMALLY INACCESSIBLE THROUGH THE INTERFACE

(75) Inventors: Richard Scott Schwerdtfeger; Lawrence Frank Weiss, both of Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/299,513

(22) Filed: Apr. 26, 1999

(51) Int. Cl.$^7$ ................................................. G06F 3/00
(52) U.S. Cl. ....................................................... 345/705
(58) Field of Search ................................. 345/700, 705, 345/708, 744, 764, 808, 809; 707/103, 103 R, 103 Y, 103 Z; 717/1–3

(56) References Cited

U.S. PATENT DOCUMENTS

| | | | |
|---|---|---|---|
| 5,668,958 A | 9/1997 | Bendert et al. | 710/128 |
| 5,721,908 A | 2/1998 | Lagarde et al. | 707/10 |
| 5,752,027 A | 5/1998 | Familiar | 707/103 |
| 5,761,477 A | 6/1998 | Wahbe et al. | 709/1 |
| 5,787,413 A | 7/1998 | Kauffman et al. | 707/2 |
| 5,801,689 A | 9/1998 | Huntsman | 345/733 |
| 5,805,829 A | 9/1998 | Cohen et al. | 709/202 |
| 5,815,703 A | 9/1998 | Copeland et al. | 707/102 |
| 6,209,006 B1 * | 3/2001 | Medl et al. | 707/501.1 |

OTHER PUBLICATIONS

*IBM Technical Disclosure Bulletin*, vol. 40, No. 07, Jul. 1997, "System for Running Unchanged Java Sockets Applications on Non–Internet Protocol Networks or on Higher–Function Internal Protocol Networks", pp. 35–36.

*Research Disclosure*, Jul. 1998, "Controlling the 3270 Server Function from a Client", pp. 996–997.

*Research Disclosure*, Jun. 1998, "Method for Converting the CallPath Architecture to the JTAPI Architecture", pp. 818–821.

*Research Disclosure*, Jun. 1998, "Jax, An Application Extractor for Java", pp. 813–815.

* cited by examiner

Primary Examiner—Crescelle N dela Torre
(74) Attorney, Agent, or Firm—Jerry B. Kraft; Jeffrey S. LaBaw

(57) ABSTRACT

Developers and users of object oriented programs who are modifying such programs with alternate access through the interactive display interface to data in such programs, which the user or developer requires, but is not normally accessible through the display interface to the object oriented program which the user is modifying, e.g. adding function to. A basic computer controlled display system for adding function to an object oriented program which has means for storing the object oriented program is provided in combination with means for getting normally accessible data from the program. There is a user interactive display interface for displaying this normally accessible data. In addition, there are means for adding displayable function to said object oriented program requiring the access of data from said object oriented program other than said normally accessible data, together with an accessing object for accessing said other data from said object oriented program. Then, in order access this other data, there are means for detecting predetermined displayable events in said display interface, means responsive to the detection of a displayable event for triggering said accessing object to access this other data, and means for displaying on the display interface the displayable function being added which required the access of this other data.

24 Claims, 4 Drawing Sheets

SYSTEM FOR ADDING FUNCTION TO AN OBJECT ORIENTED PROGRAM THROUGH A COMPUTER CONTROLLED INTERACTIVE DISPLAY INTERFACE WITH ALTERNATE ACCESS TO DATA IN THE OBJECT ORIENTED PROGRAM NORMALLY INACCESSIBLE THROUGH THE INTERFACE

TECHNICAL FIELD

The present invention relates to user interactive computer supported display technology and particularly to user friendly interactive display interfaces which may be used in the modification of object oriented programs.

BACKGROUND OF RELATED ART

The 1990's decade has been marked by a technological revolution driven by the convergence of the data processing industry with the consumer electronics industry. This advance has been even further accelerated by the extensive consumer and business involvement in the Internet over the past few years. As a result of these changes, it seems as if virtually all business and technology in the industrialized world requires human-computer interfaces.

It has been recognized for over a decade that the interfaces to all aspects of computer driven and directed technology are the key to the future of the technology. Consequently, extensive resources have been applied to the constant improvement of the human-computer interfaces, i.e. making such interfaces more user friendly, more intuitive and easier to learn and remember. This has resulted in greatly increasing the numbers of developers and programmers working on improving interactive display interfaces. Also, with the ever increasing interest in computer games and, more recently, the Internet explosion, greater numbers of developers are directing their resources toward the development of interactive display interfaces in those two consumer areas.

To understand the needs that gave rise to the present invention, it is important to note that users, as well as developers, of object oriented programs often wish to modify existing programs by adding functions to the programs. During the interactive modification of such object oriented programs, the user may require data from the program being modified or added to, which data is not normally accessible from the program. This is particularly true where the users are involved with changes to display interfaces and the data needed is textual. Also, there may be limitations in the program data which may be accessible where the users are working on emulations of the program interfaces provided by the graphics functions of the operating system of the computer display being used in combination with the object oriented program being modified. Since the user or the developer cannot access the program data which he needs through his display interface he would have no direct way of getting additional information about the program should he need it. For example, the developer is working on a display interface to a mainframe computer which is an emulation of an IBM 3270 I/O terminal or writing a particular computer input program and finds that he needs help to understand a term or other aspect of the program on which he is working, he cannot access this through the program itself through his display interface. He has to leave his development function and actively launch a help system within the program. This may be disruptive and awkward but doable where the developer has substantial computer experience. However, in the case of interface developers, they are often involved because of their design rather than computer skills and finding suitable help by launching the actual program could cause them considerable delay.

A copending patent application filed by the present inventors, U.S. Ser. No. 09/121,747, filed on Jul. 21, 1998, provides a solution for developers of interfaces to the traditional process driven nonobject oriented programs, sometimes referred to as legacy programs. That solution involves alternate access to directly inaccessible information through a stored database model of the dynamic data content of the interface. The dynamic data content should be distinguished over the dynamic pixel array content, which is the actual pixel array on the display screen as determined by the frame buffer content. The dynamic data content as tracked by the off-screen database model of the screen is a model of the actual text, graphics, icon or other symbol content of the display which, as such, may be monitored or sensed for particular text or icon content. This dynamic data content is tracked and updated in the database model screen by screen as the display interface is modified in this prior art process.

While this approach has been quite effective in aiding developers of traditional programming, it is not available to developers of object oriented programming, because in object oriented programs there is no stage at which the actual data content of the display interface may be tracked. In object oriented programming, the data defining display screens is directly reduced to the pixel arrays from which the screen element content cannot be determined.

SUMMARY OF THE PRESENT INVENTION

The present invention provides developers and users of object oriented programs who are modifying such programs with alternate access through the interactive display interface to data in such programs which the user or developer requires but is not normally accessible through the display interface to the object oriented program which the user is modifying, e.g., adding function to. Thus, the present invention provides a basic computer controlled display system for adding function to an object oriented program which has means for storing the object oriented program in combination with means for getting normally accessible data from program. There is a user interactive display interface for displaying this normally accessible data. In addition, there are means for adding displayable function to said object oriented program requiring the access of data from said object oriented program other than said normally accessible data together with an accessing object for accessing said other data from said object oriented program. Then, in order to access this other data, there are means for detecting predetermined displayable events in said display interface, means responsive to the detection of a displayable event for triggering said accessing object to access this other data and means for displaying on the display interface, the displayable function being added which required the access of this other data.

These displayable events in the display interface may be visible on the screen when they occur or they may be in portions of the display interface. In a graphical user interface (GUI), although there are many existent elements in the interface, some are covered up, e.g. in an overlapped underlying window. Alternately, the displayable portion of the window is larger than the screen, and, thus, such existent elements are not visible until the user scrolls to them.

The invention may be effectively used when the detected event is text on the screen and particularly displayed text indicates a need for help relative to the displayed text. This text event indicating a need for help may be the result of an interactive user input. Alternatively, the user text input may have an error of a type indicating a need for help. In such a case, the detected event would be the erroneous input. In addition, once accessed, the accessed data may be displayed on the same screen simultaneously with the event which triggered the access.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
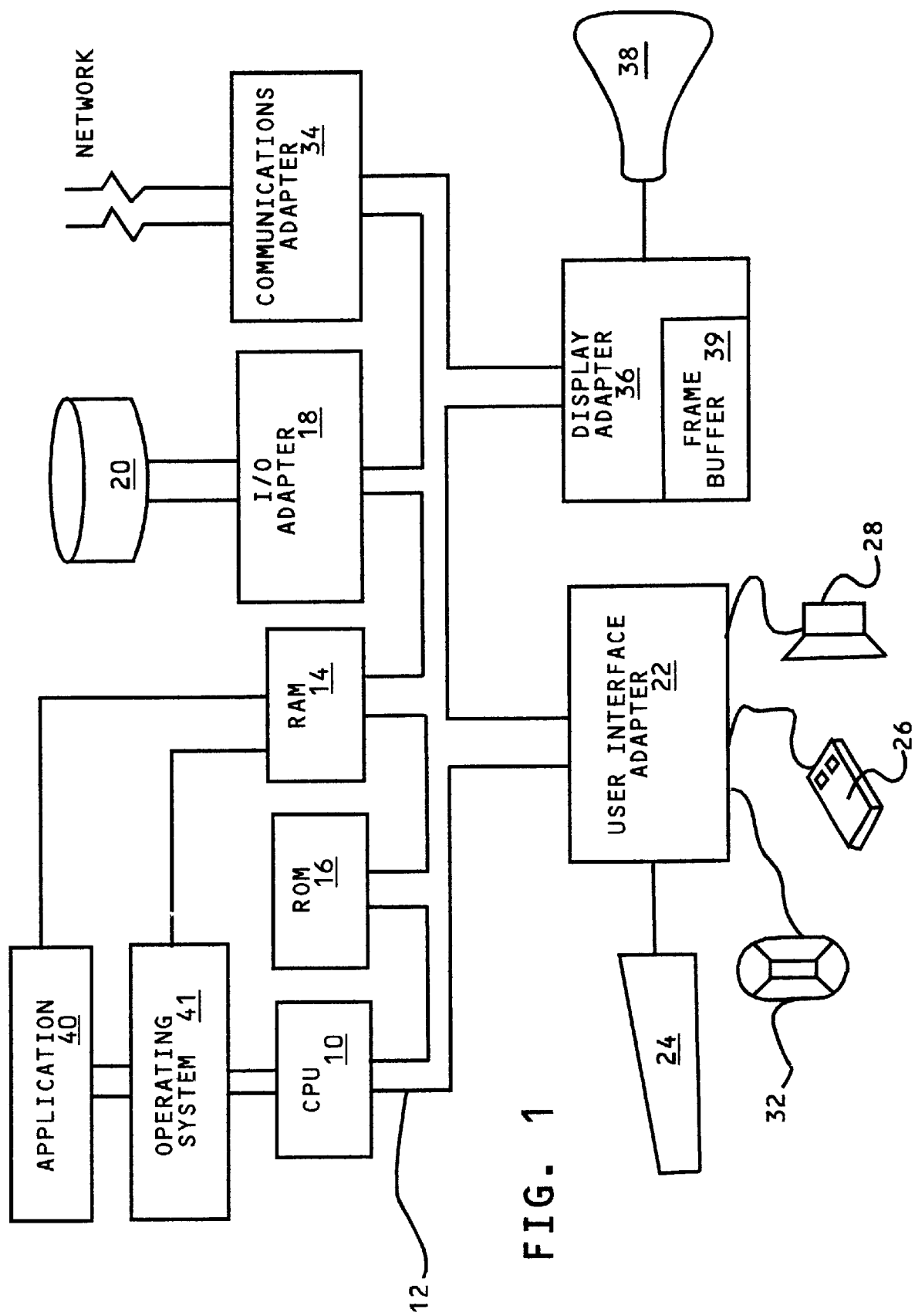
FIG. 1 is a block diagram of a data processing system including a central processing unit which is capable of implementing the user interactive display used in the present invention.

Referring to FIG. 1, a typical data processing system is shown which may function as the computer controlled display system used by object oriented program developers and users who are adding function to object oriented programs for access to data not normally available from the interface to the objects being modified in accordance with the present invention. A central processing unit (CPU), such as one of the PC microprocessors available from International Business Machines Corporation (IBM), is provided and interconnected to various other components by system bus 12. An operating system 41 runs on CPU 10, provides control and is used to coordinate the function of the various components of FIG. 1. It also provides the GUI which contains the predetermined or listened for events which will be used to trigger alternate access to data in this invention. Operating system 41 may be any commercially available system, such as the OS/2 operating system available from IBM (OS/2 is a trademark of International Business Machines Corporation); Microsoft's Windows 95$^{(TM)}$ or Windows NT$^{(TM)}$, as well as Unix$^{(TM)}$ and AIX$^{(TM)}$ operating systems. A programming application is illustrated as application 40, an object oriented program for adding function to an existing object oriented program to be subsequently described in more detail, runs in conjunction with operating system 41 and provides output calls to the operating system 41 to perform a variety of interactive user interface operations used in the development of object oriented programs.

For example, the operation may be modifying object oriented programs providing an interface to a mainframe computer which is an emulation of an IBM 3270 I/O terminal or for writing a particular computer input program.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the application 40, are loaded into RAM 14, which is the computer system's main memory during the object oriented program development. I/O adapter 18 may be a small computer system adapter that communicates with the disk storage device 20, i.e. a hard drive. Communications adapter 34 interconnects bus 12 with an outside network enabling the data processing system to communicate with other such systems, particularly when the operations controlled by the interfaces of the present invention are in a network environment or when the controlled operations are in communication systems. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39, which is a storage device that holds a representation of each pixel on the display screen 38. Images may be stored in frame buffer 39 for display on monitor 38 through various components, such as a digital-to-analog converter (not shown) and the like. By using the aforementioned I/O devices, a user is capable of inputting information to the system through the keyboard 24, trackball 32 and, particularly, mouse 26 and receiving output information from the system via speaker 28 and display 38.

As noted above, the present system is operable in a network environment. In such a network environment, the displayable function added to the object oriented program may be a network browser function.

Figure 2:
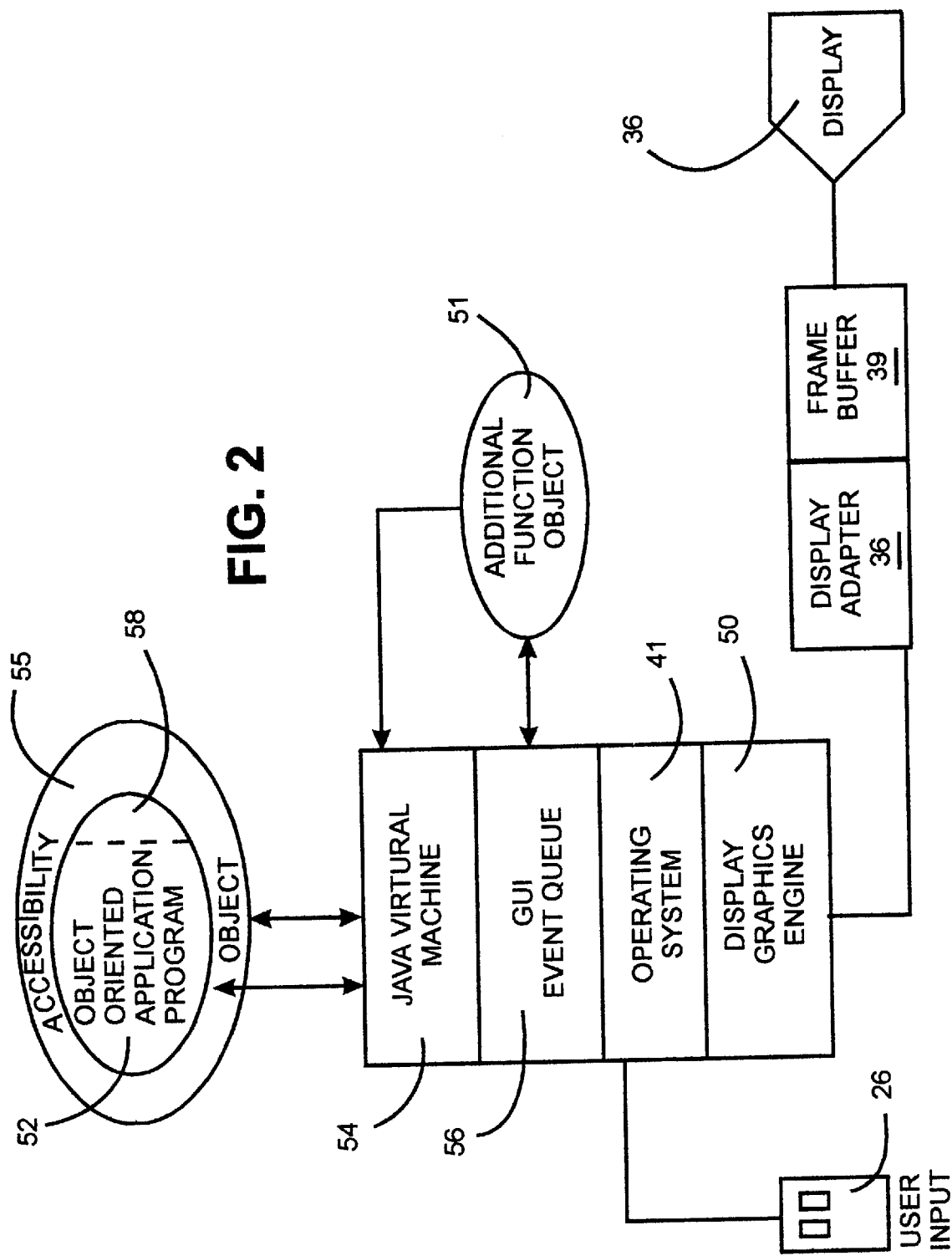
FIG. 2 is a generalized diagram showing the components involved in the object oriented program modification of the present invention including the alternate access to data in object oriented program which is not normally accessible.

At this point with reference to FIG. 2, we will first describe the fundamentals involved in the present invention. FIG. 2 shows the details of how the object oriented program modification application of this invention is associated with the data processing system of FIG. 1 in the implementation of the invention. It is important to note that the present invention is applicable to situations where anyone, such as a developer or user of object oriented programs, who is modifying the program wishes to access data not normally accessible from the particular object oriented application being modified and, thus, currently active on the display screen. As set forth hereinabove, this situation is often common when interfaces to object oriented applications, systems or the applications themselves are being modified. Developers or users who are adding function to existing object oriented programs need data in such programs which is not normally accessible from the program through the display interface to the program.

As set forth hereinabove, the present invention provides the interactive user with an alternate route to access such normally inaccessible data via an accessing object which has a compatible or common object oriented interface with the original application object being modified so as to be triggered by predetermined events listened for in the GUI through which the developer or user is working, e.g., adding function to his object oriented program.

With respect to object oriented programming background, the computer and communications industries have been extensively participating in the development and continual upgrading of object oriented programming systems, such as the Java system. For details and background with respect to object oriented programming systems, such as the Java programming system, C++ and others, reference may be made to some typical texts: *Just Java,* 2nd Edition, Peter van der Linden, Sun Microsystems, 1997; *Thinking in Java,* Bruce Eckel, Prentice Hall PTR, 1998; and *Objects, Components and Frameworks with UML,* Desmond F. D'Sousa et al., Addison-Wesley, 1998. The functions to be described may be especially effectively implemented using Java ™1.2 or Java Swing. Java 1.2 is detailed and covered in the text *Java Swing,* Robert Eckstein et al., published by O'Reilly and Associates, California 1998.

The system of the present invention is detailed in FIG. 2. The object oriented application program 52 is being modified by adding function to it as it resides in Java Virtual Machine 54. The basic functions of the Java Virtual Machine and its relations to objects therein and to the computer operating system, such as operating system 41, is described in detail at pages 455–461 of the text, *Java Jump Start,* Noel Enete, published by Prentice Hall, New Jersey, 1997. The developer-user through an input device such as mouse 26 through operating system 41 and the additional functional object 51 interactively interfaces with application program 52. Display interface requirements are provided by the graphics engine 50 of operating system 41, e.g. the graphics/text functions of Windows95$^{(TM)}$, which in turn translates the screen by screen dynamic pixel array layouts provided by the application 52 in Java Virtual Machine 54 for the interactive developer/user layouts. These pixel arrays are provided through display adapter 36 to frame buffer 39 which maintains the user interactive pixel array panels on display 38.

Now, if in the addition of a function to the application program 52 or its display interface, the user or developer has the need to find out the syntax of a particular programming term in the application program 52 which he is modifying or help with the applicability of a function in the case that program 52 may be a word processing program, he normally cannot obtain this through the interface to the program. For this purpose there is the GUI event queue 56 which contains a set of predetermined events in the GUI which would indicate a need for accessibility object 55, which is shown conceptually as interfacing with and encasing the object oriented program 52 being modified. Accessibility object 55 listens for and is called or triggered by a predetermined GUI (display) event in queue 56.

The function of accessibility objects is described in detail in the above-mentioned *Java Swing* text in Chapter 25, *Programming with Accessibility,* pp. 959–999. The accessibility object could then launch an appropriate access to data 58 other than the data which can be normally accessed from program 52 to obtain the data needed. The data description could be the stored description of the data needed for the display, i.e. the AccessibleDescription for the needed text or image data 58, access from the object oriented program 52 from which an appropriate database search could be run. A description of the use of the Java 1.2 AccessibleDescription to get data is found on page 967 of the above *Java Swing* text.

Figure 3:
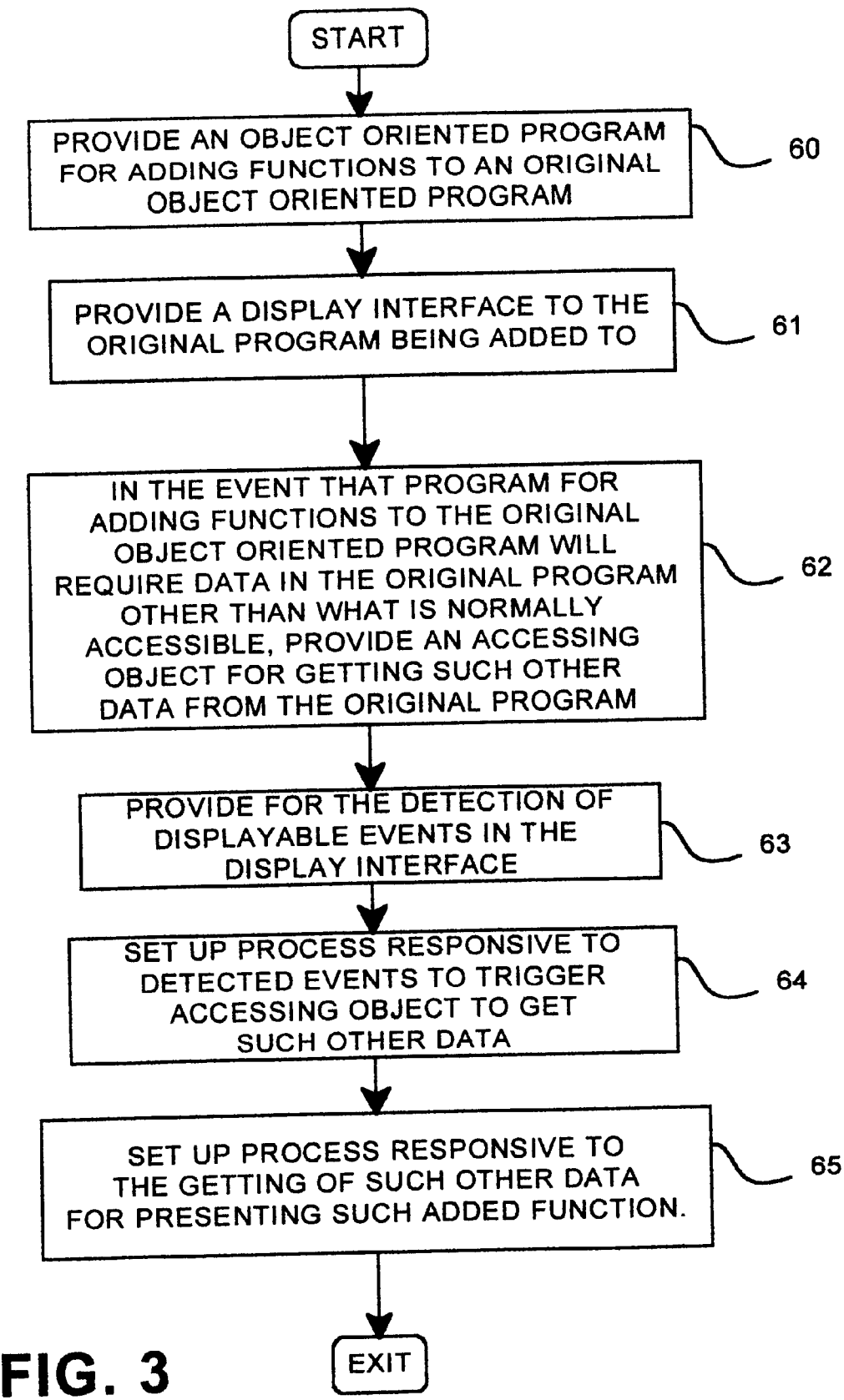
FIG. 3 is a flowchart showing the setting up of the program of the present invention for using an alternate accessing object triggered by display interface events to access information through the display interface which would normally be inaccessible from the object oriented program being modified.

Now with reference to FIG. 3, we will describe the setting up of a system according to the present invention for alternate access to data not normally accessible from the object oriented program 52 to add function is being added. Step 60, there is provided an object oriented program for modifying object oriented programs to add a function. There is also set up an interactive display interface for displaying data normally accessible from object oriented programs being added, step 61. Then, in the event that the program for adding functions to the original program as modified will require data other than data which is normally accessible from the original object oriented program, there is provided, step 62, an accessing object for getting such data from the original program. Then, step 63, there is a provision for the detection of events in the display GUI which would indicate the need for access to the other data in the original object, and a process is set up to trigger the accessing object to access such data from the original object being added to in response to predetermined detected events, step 64. Then a process is set up for presenting the added function responsive to the getting of such other data, step 65.

Figure 4:
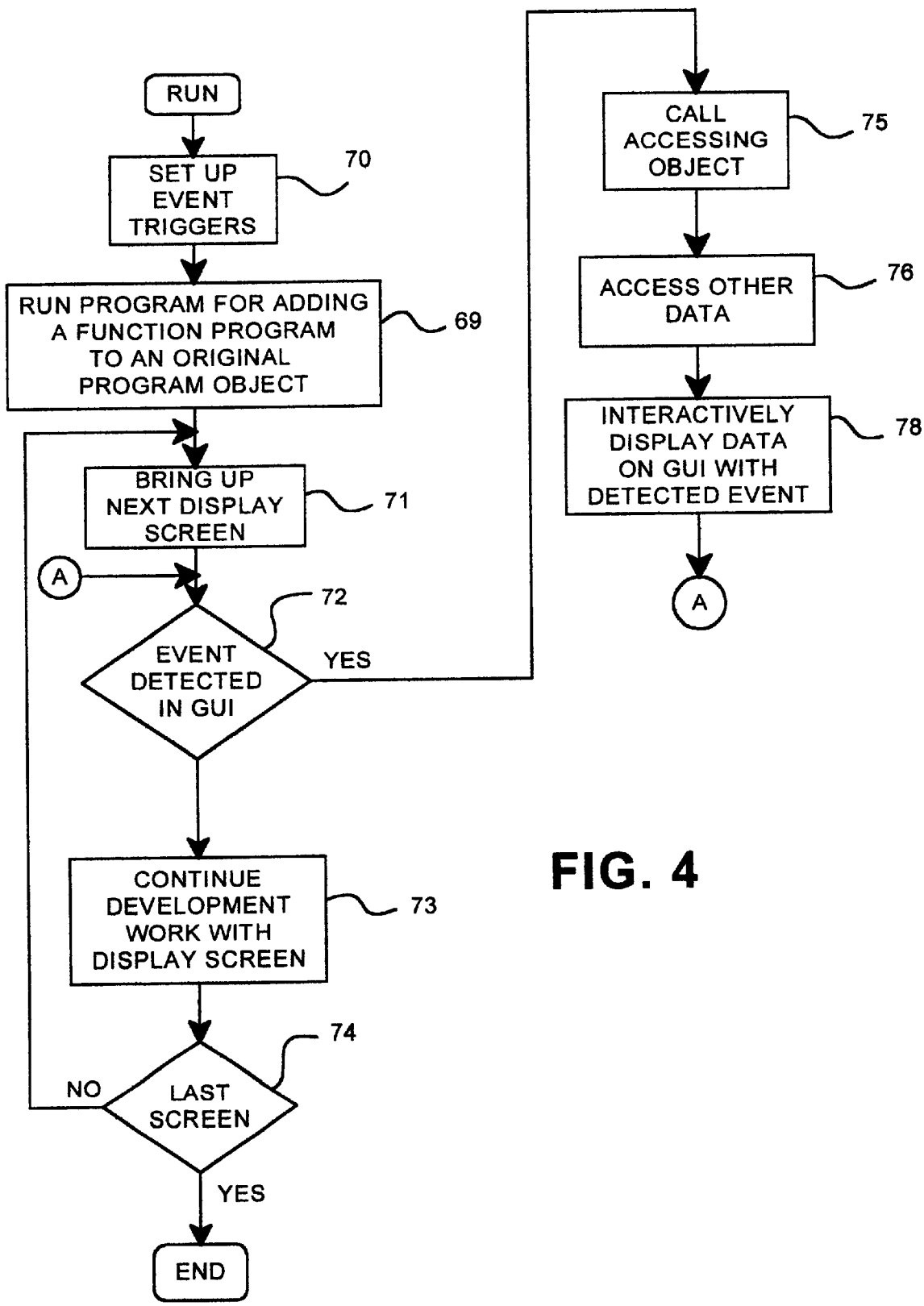
FIG. 4 is a flowchart showing the running of the program described with respect to FIG. 3.

Now that the basic programs have been described and illustrated, there will be described with respect to FIG. 4 a flowchart of a simple operation of the program for adding function to the original object oriented program could be run. For simplicity in illustration in this portion of the description related to the running of the program, we will assume that the data event triggers are related to the getting of textual material such as help data. A queue of event triggers, such as cursor positioning or highlighting to be sensed for, is set up, step 70. Then, the object program for adding a function to the original program is run, step 69, and the initial or next screen is brought up by the user, step 71. Then, in decision step 72, the event triggers in each screen update are sensed for. If no trigger is found, then the user continues with his modification work, if any, involving the particular screen, step 73, and a determination is made as to whether the last screen has been reached, decision step 74. If Yes, the run is at an end. If No, the process returns to step 71 where the next screen data content is brought up. If, in decision step 72, a queued event is sensed, then the system goes to the accessing object, step 75, which accesses the appropriate other data in the object oriented program being added to, step 76, as previously described. Then, the other data accessed is used to generate interface data required by the user, which may be displayed on the interactive display along with the developmental data which the user already has interactively displayed, step 78, after which the process returns to step 72 via branch "A" where a determination is made as to whether any other event trigger has been sensed and the process continues as described above.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD-ROM computer input or in a floppy disk for use in a floppy disk drive computer input. Further, the program instructions may be stored in the memory of another computer prior to use in the system of the present invention and transmitted over a local area network (LAN) or a wide area network (WAN), such as the Internet, when required by the user of the present invention. One skilled in the art should appreciate that the processes controlling the present invention are capable of being distributed in the form of computer readable media of a variety of forms.

While the object oriented programs and objects have been illustrated using the Java programming language and system, it should be understood that the invention may be implemented with other object oriented programming systems.

Although certain preferred embodiments have been shown and described, it will be understood that many changes and modifications may be made therein without departing from the scope and intent of the appended claims.

What is claimed is:

1. A computer controlled display system for adding function to an object oriented program comprising:

means for storing a user interactive object oriented program, means for getting normally accessible data from said object oriented program, user interactive display interface means for displaying said normally accessible data, means for adding displayable function to said object oriented program requiring the access of data from said object oriented program other than said normally accessible data, an accessing object for accessing said other data from said object oriented program, means for detecting predetermined displayable events in said display interface, means responsive to the detection of a displayable event for triggering said accessing object to access said other data, and means responsive to the accessing of said other data for presenting said displayable function.

2. The computer controlled display system of claim 1, wherein said detected displayable event is visible when detected.

3. The computer controlled display system of claim 2, wherein said detected displayable event includes displayed text.

4. The computer controlled display system of claim 3 wherein said displayed text is responsive to a user input indicating a need for help relative to displayed text.

5. The computer controlled display system of claim 4 wherein said user input designates the displayed text for which help is needed.

6. The computer controlled display system of claim 4 wherein said user input indicating a need for help is an error in said user input.

7. The computer controlled display system of claim 1 wherein said added displayable function is a network browser program.

8. The computer controlled display system of claim 2 wherein said other data is displayed simultaneously with said displayable event.

9. In a computer controlled display system, a method for adding function to an object oriented program comprising:

storing a user interactive object oriented program, getting normally accessible data from said object oriented program, displaying said normally accessible data on a user interactive display interface, adding displayable function to said object oriented program requiring the access of data from said object oriented program other than said normally accessible data, accessing said other data from said object oriented program through an accessing object, detecting predetermined displayable events in said display interface, responsive to the detection of a displayable event, triggering said accessing object to access said other data, and presenting said displayable function responsive to the accessing of said other data.

10. The method of claim 9 wherein said detected displayable event is visible when detected.

11. The method of claim 10 wherein said detected displayable event includes displayed text.

12. The method of claim 11 wherein said text is displayed responsive to a user input indicating a need for help relative to displayed text.

13. The method of claim 12 wherein said user input designates the displayed text for which help is needed.

14. The method of claim 12 wherein said user input indicating a need for help is an error in said user input.

15. The method of claim 9 wherein said added displayable function is a network browser program.

16. The method of claim 10 wherein said other data is displayed simultaneously with said displayable event.

17. A computer program having code in a computer readable medium for adding function to an object oriented program on a computer controlled display system comprising:

means for storing a user interactive object oriented program, means for getting normally accessible data from said object oriented program, user interactive display interface means for displaying said normally accessible data, means for adding displayable function to said object oriented program requiring the access of data from said object oriented program other than said normally accessible data, an accessing object for accessing said other data from said object oriented program, means for detecting predetermined displayable events in said display interface, means responsive to the detection of a displayable event for triggering said accessing object to access said other data, and means responsive to the accessing of said other data for presenting said displayable function.

18. The computer program of claim 17 wherein said detected displayable event is visible when detected.

19. The computer program of claim 18 wherein said detected displayable event includes displayed text.

20. The computer program of claim 19 wherein said displayed text is responsive to a user input indicating a need for help relative to displayed text.

21. The computer program of claim 20 wherein said user input designates the displayed text for which help is needed.

22. The computer program of claim 20 wherein said user input indicating a need for help is an error in said user input.

23. The computer program of claim 17 wherein said added displayable function is a network browser program.

24. The computer program of claim 18 wherein said other data is displayed simultaneously with said displayable event.

* * * * *